(12) United States Patent
El-Hennaway et al.

(10) Patent No.: US 8,077,636 B2
(45) Date of Patent: Dec. 13, 2011

(54) TRANSCODERS AND MIXERS FOR VOICE-OVER-IP CONFERENCING

(75) Inventors: Mohamed Samy El-Hennaway, Belleville (CA); Rafik A. Goubran, Ottawa (CA); Zhihong Qian, Shanghai (CN)

(73) Assignee: Nortel Networks Limited, Mississauga, Ontario (CA)

( * ) Notice: Subject to any disclaimer, the term of this patent is extended or adjusted under 35 U.S.C. 154(b) by 0 days.

(21) Appl. No.: 12/587,591

(22) Filed: Oct. 9, 2009

(65) Prior Publication Data

US 2010/0111074 A1 May 6, 2010

Related U.S. Application Data

(63) Continuation of application No. 10/892,020, filed on Jul. 15, 2004, now Pat. No. 7,619,995.

(60) Provisional application No. 60/488,254, filed on Jul. 18, 2003.

(51) Int. Cl.
*H04L 12/26* (2006.01)
(52) U.S. Cl. ......... 370/260; 370/252; 370/493; 370/494
(58) Field of Classification Search .................. 370/260, 370/215, 219, 493, 266, 252, 494
See application file for complete search history.

(56) References Cited

U.S. PATENT DOCUMENTS

| | | | | |
|---|---|---|---|---|
| 4,691,292 A | | 9/1987 | Rothweiler | 364/724 |
| 4,972,484 A | * | 11/1990 | Theile et al. | 704/200.1 |
| 5,280,561 A | | 1/1994 | Satoh et al. | 395/2 |
| 5,321,793 A | * | 6/1994 | Drogo De Iacovo et al. | 704/220 |
| 6,370,507 B1 | * | 4/2002 | Grill et al. | 704/500 |
| 6,449,596 B1 | | 9/2002 | Ejima | 704/501 |
| 6,463,414 B1 | | 10/2002 | Su et al. | 704/270.1 |
| 6,584,437 B2 | | 6/2003 | Heikkinen et al. | 704/207 |
| 6,640,209 B1 | | 10/2003 | Das | 704/219 |
| 6,675,144 B1 | * | 1/2004 | Tucker et al. | 704/264 |
| 6,691,082 B1 | | 2/2004 | Aguilar et al. | 704/219 |
| 6,829,579 B2 | | 12/2004 | Jabri et al. | 704/221 |
| 6,956,828 B2 | | 10/2005 | Simard et al. | 370/260 |
| 7,006,616 B1 | * | 2/2006 | Christofferson et al. | 379/202.01 |
| 7,136,810 B2 | * | 11/2006 | Paksoy et al. | 704/219 |

(Continued)

FOREIGN PATENT DOCUMENTS

WO  WO 02/087137  10/2002

OTHER PUBLICATIONS

Kleijn et al.: "Interpolation of the Pitch-Predictor Parameters in Analysis-by-Synthesis Speech Coders"; 1994; IEEE; pp. 42-53.

*Primary Examiner* — Gary Mui
*Assistant Examiner* — Dewanda Samuel
(74) *Attorney, Agent, or Firm* — Withrow & Terranova, PLLC

(57) ABSTRACT

Transcoders and mixers having reduced algorithmic delay and processing complexity. An improved mixer for signals having encoded speech parameters wherein the parameters obtained through decoding are used by a parameter estimator to improve the encoding by providing a parameter estimate for the mixed signal. In the case of pitch parameters, the mixer uses the principle of strong-pitch-domination. The mixing of wideband signals is simplified by performing mixing of individual lower and upper sub-bands. A transcoder and a mixer that converts a wideband signal into a narrowband signal relies upon high frequency suppression. A transcoder and a mixer that converts a narrowband signal into a wideband signal relies upon filter combination.

16 Claims, 12 Drawing Sheets

U.S. PATENT DOCUMENTS

| | | | |
|---|---|---|---|
| 7,221,663 B2 * | 5/2007 | Rodman et al. | 370/329 |
| 7,280,878 B1 * | 10/2007 | Rossum | 700/94 |
| 7,307,981 B2 | 12/2007 | Choi et al. | 370/352 |
| 7,330,814 B2 * | 2/2008 | McCree | 704/219 |
| 7,403,893 B2 | 7/2008 | Huart et al. | 704/207 |
| 7,522,586 B2 * | 4/2009 | Unger | 370/356 |
| 7,634,402 B2 * | 12/2009 | Lee et al. | 704/229 |
| 2001/0053132 A1 | 12/2001 | Attimont et al. | 370/260 |
| 2002/0007280 A1 | 1/2002 | McCree | 704/500 |
| 2003/0065508 A1 | 4/2003 | Tsuchinaga et al. | 704/215 |
| 2004/0019492 A1 | 1/2004 | Tucker et al. | 704/500 |
| 2004/0156397 A1 | 8/2004 | Heikkinen et al. | 370/516 |
| 2004/0254786 A1 | 12/2004 | Kirla et al. | 704/216 |
| 2005/0015243 A1 | 1/2005 | Lee et al. | 704/219 |
| 2005/0165603 A1 | 7/2005 | Bessette et al. | 704/200.1 |
| 2008/0126086 A1 * | 5/2008 | Vos et al. | 704/225 |

* cited by examiner

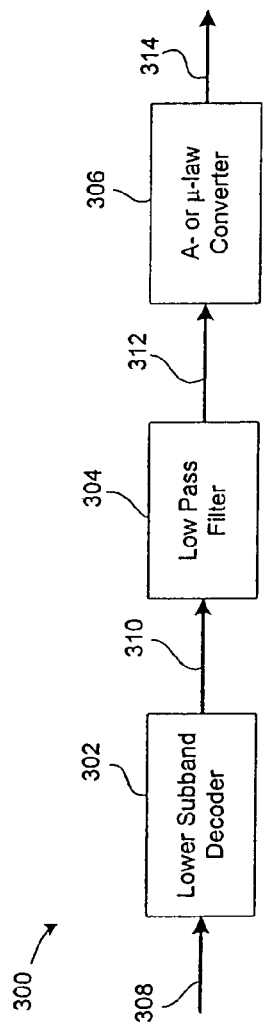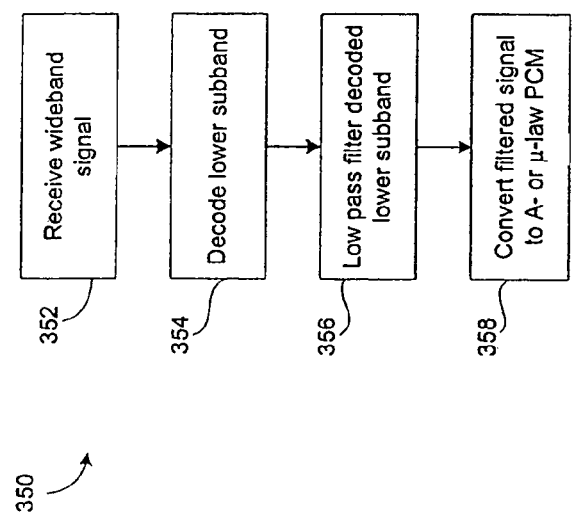

TRANSCODERS AND MIXERS FOR VOICE-OVER-IP CONFERENCING

CROSS-REFERENCE TO RELATED APPLICATIONS

This application is a continuation of U.S. patent application Ser. No. 10/892,020, filed Jul. 15, 2004 now U.S. Pat. No. 7,619,995, which claims priority to U.S. provisional patent application No. 60/488,254, filed Jul. 18, 2003, the contents of which are incorporated herein by reference in their entireties.

FIELD OF THE INVENTION

This invention relates to signal processing in packet-based networks and, in particular, to transcoders and mixers for use in packet-based networks.

BACKGROUND OF THE INVENTION

Digital packet-based networks, like the Internet, are increasingly being used to transmit voice signals. Given the asynchronous nature of packet-based networks, any extra complexity or delay in the network can present problems when the voice signal is reconstructed from its packetized form at the receiving end.

Voice-over-Internet-Protocol (VoIP) technology attempts to provide for voice communication over the Internet through the use of various communications protocols by which the voice signals can be encoded for transmission and decoded when received. In some cases, participants in a conversation will be using different protocols. Accordingly, it is necessary to convert a VoIP signal encoded in one protocol to a VoIP signal encoded using another protocol.

In a multi-speaker environment, the ability to mix signals from various participants in a mixer is important to providing a Quality of Service (QoS) comparable with traditional dedicated public-switched telephone network (PSTN) teleconferencing. Again, if participants are using different codecs, then the mixer must accommodate these differences and consolidate the signals into one mixed signal using a selected communications protocol.

Typical VoIP communications protocols include narrowband protocols G.711, G.729, and G.729(A), and wideband protocols 722 and 722.2.

The various communications protocols are typically applied to signals using codecs (encoders/decoders). Codecs are signal processing devices, usually implemented on a digital signal processor. They typically operate on a frame by frame basis, often with a buffer of frames for 'lookahead' purposes and/or to reduce jitter. This tends to introduce delay and complexity such that, in a mixer, the process of decoding a signal, mixing it with another signal, and encoding the mixed signal can result in problems, including packet loss, jitter, and end-to-end delay. All of these problems lead to difficulties in obtaining satisfactory QoS for VoIP.

Accordingly, there remains a need for VoIP technology having an improved QoS through reduced complexity and delay in transcoding and mixing.

SUMMARY OF THE INVENTION

The present invention provides improved VoIP technology through reduced algorithmic and processing complexity and delay.

In one aspect, the present invention provides a VoIP mixer for mixing a first input signal with a second input signal, the first and second input signals being signals having encoded therein a first and second correlation parameter, respectively. The VoIP mixer includes (a) a first decoder for receiving the first input signal and outputting a first decoded signal, the first decoder extracting the first correlation parameter from the first input signal, (b) a second decoder for receiving the second input signal and outputting a second decoded signal, the second decoder extracting the second correlation parameter from the second input signal, (c) a mixer coupled to the first and second decoders, the mixer receiving the first and second decoded signals and producing a mixed signal, (d) a parameter estimator coupled to the first and second decoders, the parameter estimator receiving the first and second correlation parameters and outputting an open loop parameter estimate, and (e) an encoder coupled to the mixer and the parameter estimator, the encoder receiving the mixed signal and the open loop parameter estimate and outputting an encoded signal, wherein the encoder includes a closed-loop analyzer for creating the encoded signal and wherein the closed-loop analyzer employs the open loop parameter estimate.

In a further aspect, the present invention provides a method for mixing a first input signal with a second input signal in a VoIP system, the first and second input signals comprising signals having encoded therein a first and second correlation parameter, respectively. The method includes the steps of, in a decoder, extracting the first and second correlation parameters from the first and second input signals, decoding the first and second input signals and outputting a first decoded signal and a second decoded signal, mixing the first and second decoded signals to produce a mixed signal, determining an open loop parameter estimate based upon said extracted first and second correlation parameters, and encoding the mixed signal, wherein the step of encoding includes performing a closed loop analysis to obtain a mixed signal correlation parameter for use in encoding the mixed signal, and wherein the closed loop analysis employs the open loop parameter estimate.

In another aspect, the present invention provides a VoIP mixer for mixing a first input signal with a second input signal, the first and second input signals comprising wideband signals each having an upper sub-band and a lower sub-band. The VoIP mixer includes a first wideband decoder for receiving the first input signal and outputting a first lower sub-band decoded signal and a first upper sub-band decoded signal, a second wideband decoder for receiving the second input signal and outputting a second lower sub-band decoded signal and a second upper sub-band decoded signal, a lower sub-band mixer for receiving the first and second lower sub-band decoded signals and producing a mixed lower sub-band signal, a upper sub-band mixer receiving the first and second upper sub-band decoded signals and producing a mixed upper sub-band signal, and a wideband encoder for receiving the mixed lower and upper sub-band signals and outputting an encoded mixed signal.

In a further aspect, the present invention provides method for mixing a first input signal with a second input signal in a VoIP system, the first and second input signals comprising wideband signals each having an upper sub-band and a lower sub-band. The method includes the steps of (a) decoding the first input signal to produce a first lower sub-band decoded signal and a first upper sub-band decoded signal, (b) decoding the second input signal to produce a second lower sub-band decoded signal and a second upper sub-band decoded signal, (c) mixing the first and second lower sub-band decoded signals to produce a mixed lower sub-band signal, (d) mixing the first and second upper sub-band decoded signals to produce a mixed upper sub-band signal, and (e) encoding the mixed lower and upper sub-band signals to produce an encoded mixed wideband signal.

In another aspect, the present invention provides a transcoder for converting a first input signal to an output signal, the first input signal comprising a wideband signal having an upper sub-band and a lower sub-band, and the output signal being a narrowband signal. The transcoder includes a lower sub-band decoder having an input for receiving the input signal and an output for providing a decoded lower sub-band signal, a low pass filter having an input for receiving the decoded lower sub-band signal and an output for providing a filtered lower sub-band signal, and a narrowband encoder for encoding the filtered lower sub-band signal to produce the output signal. In a further aspect, the present invention provides a VoIP mixer including such a transcoder.

In a further aspect, the present invention provides a method for converting a first input signal to an output signal in a VoIP system, the first input signal comprising a wideband signal having an upper sub-band and a lower sub-band, and the output signal comprising a narrowband signal. The method includes the steps of decoding the lower sub-band of the input signal to produce a lower sub-band signal, low pass filtering the lower sub-band signal to produce a filtered lower sub-band signal, and encoding the filtered lower sub-band signal to produce the output signal. In a further aspect, the present invention provides a method of mixing that includes such method steps.

In yet another aspect, the present invention provides a transcoder for converting a first input signal to an output signal, the first input signal comprising a narrowband signal and the output signal comprising a wideband signal. The transcoder includes a narrowband decoder for receiving the first input signal and outputting a decoded signal, a first filter for receiving the decoded signal and outputting a first lower sub-band signal, the first filter, the first filter having a transfer characteristic for introducing a first artificial aliasing into the decoded signal to produce the first lower sub-band signal, a second filter for receiving the decoded signal and outputting a first upper sub-band signal, the second filter having a transfer characteristic for introducing a second artificial aliasing into the decoded signal to produce the first upper sub-band signal, and a wideband encoder for receiving the first lower sub-band signal and the first upper sub-band signal, encoding the sub-band signals, and producing the output signal. In a further aspect, the present invention provides a VoIP mixer including such a transcoder.

In yet a further aspect, the present invention provides method for converting a first input signal to an output signal in a VoIP system, the first input signal comprising a narrowband signal and the output signal comprising a wideband signal. The method includes the steps of narrowband decoding the first input signal to produce a decoded signal, filtering the decoded signal to produce a first lower sub-band signal, wherein said filtering includes introducing a first artificial aliasing into the decoded signal to produce the first lower sub-band signal, filtering the decoded signal to produce a first upper sub-band signal, wherein said filtering includes introducing a second artificial aliasing into the decoded signal to produce the first upper sub-band signal, and wideband encoding the first lower sub-band signal and the first upper sub-band signal to produce the output signal. In a further aspect, the present invention provides a method of mixing that includes such method steps.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made, by way of example, to the accompanying drawings which show an embodiment of the present invention, and in which:

FIG. 5 shows a block diagram of a VoIP transcoder for converting a wideband signal to a narrowband signal;

FIG. 6 shows, in flowchart form, a method of transcoding a wideband signal into a narrowband signal in a VoIP system;

Similar reference numerals are used in different figures to denote similar components.

DESCRIPTION OF SPECIFIC EMBODIMENTS

The following detailed description of specific embodiments of the present invention does not limit the implementation of the invention to any particular programming language or signal processing architecture. In one embodiment, the present invention is implemented, at least partly, using a digital signal processor. It will be understood that the present invention may be implemented using other architectures, including a microcontroller, a microprocessor, discrete components, or combinations thereof. Any limitations presented herein as a result of a particular type of architecture or programming language are not intended as limitations of the present invention.

Figure 1:
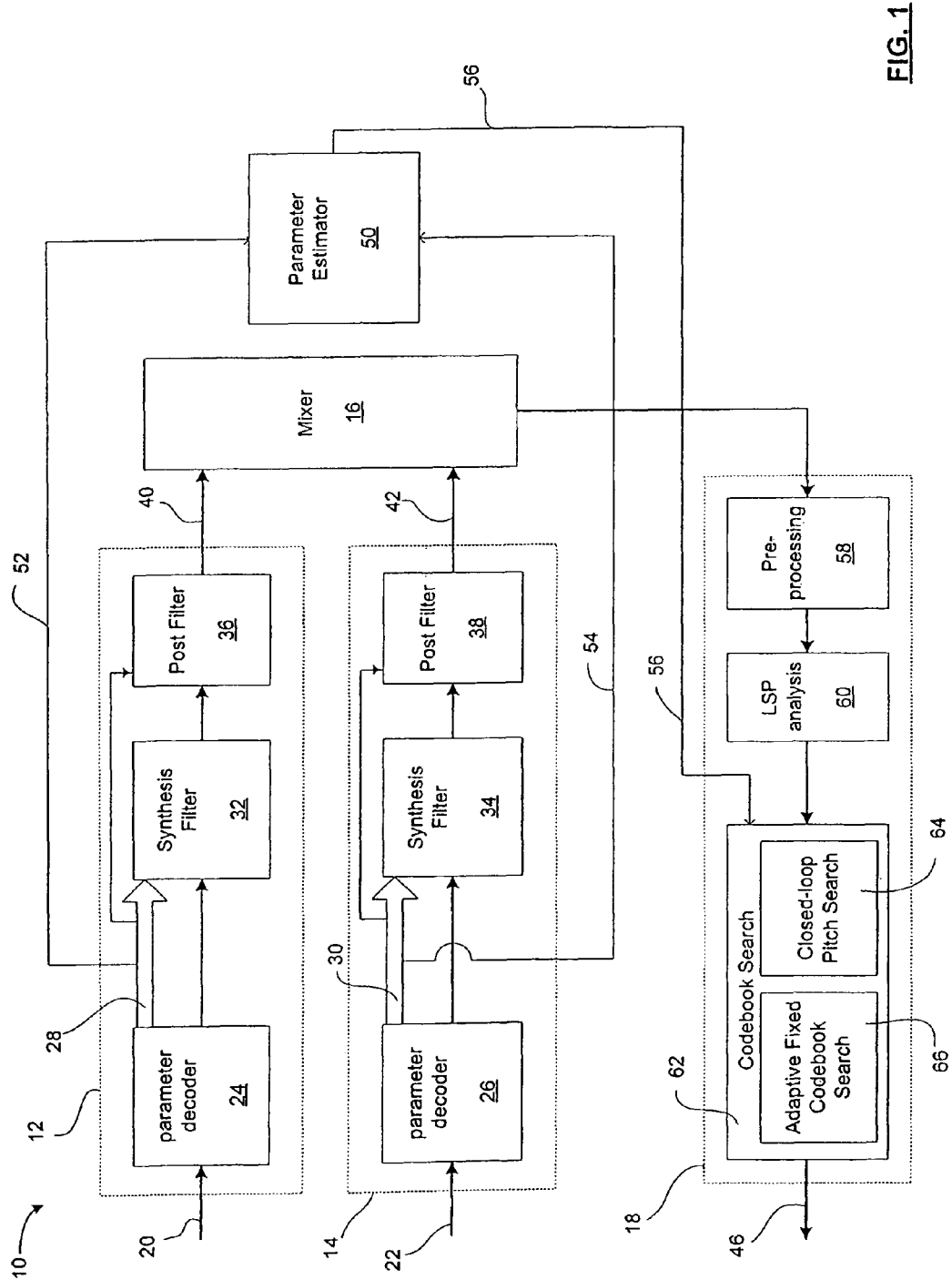
FIG. 1 shows, in block diagram form, an embodiment of a VoIP mixer for mixing signals having encoded speech parameters.

Reference is first made to FIG. 1, which shows, in block diagram form, an embodiment of a VoIP mixer 10 for mixing signals having encoded speech parameters.

The VoIP mixer 10 includes a first decoder 12, a second decoder 14, a mixer 16, and an encoder 18. The first decoder 12 receives a first input signal 20 and the second decoder 14 receives a second input signal 22. The first and second input signals 20, 22 are encoded using a communications protocol that encodes various speech parameters within the signal. These parameters may include parameters reflecting short- and/or long-term correlations in the speech signal and other parameters for refining the signal.

In one embodiment, the first and second input signals 20, 22 are narrowband signals encoded using the G.729(A) protocol. The G.729(A) protocol employs conjugate-structure algebraic-code-excited linear-predictive (CS-ACELP) coding. Each frame of speech in a G.729(A) signal is 10 milliseconds in duration and is based upon 80 samples at a sampling rate of 8 kHz. For each frame, the encoder extracts the parameters of the CELP model and encodes these parameters within the signal. The parameters include, line spectrum pairs (LSP) for short term correlations in the signal, adaptive codebook parameters such as pitch parameters for long-term correlations in the signal, and fixed-codebook parameters to refine the excitation signal.

A G.729(A) encoder performs LP analysis and an open-loop pitch search once per frame. The open-loop pitch search analyzes the perceptual weighted signal to find a rough open-loop pitch delay $T_{op}$. The encoder then performs a closed-loop pitch search to find the optimal pitch delay for the current subframe. Through using the estimate of open-loop pitch delay $T_{op}$, the complexity and delay of the closed-loop pitch search is reduced by limiting the search range around $T_{op}$. An algebraic codebook search, adaptive-codebook gain and algebraic-codebook gain quantizations, and a memory update are performed once per subframe.

A G.729(A) decoder receives an input signal and decodes the parameters encoded in the signal. The parameters, such as the pitch parameters, gains, LSPs, and fixed codebook vectors, are then used to obtain the excitation and synthesis filter parameters. The speech signal is then reconstructed by filtering this excitation through the short term synthesis filter and further enhanced by post filtering.

Referring back to FIG. 1, the first and second decoders 12, 14 in the VoIP mixer 10 each include a parameter decoder 24, 26 that extracts speech parameters 28, 30 from the input signal 20, 22. The speech parameters 28, 30 are employed in creating a synthesis filter 32, 34, which together with a post filter 36, 38 produces first and second decoded PCM signals 40, 42, respectively.

The first and second decoded PCM signals 40, 42 obtained from the first and second decoders 12, 14 are mixed together in the mixer 16, which outputs a mixed signal 44. This mixed signal 44 is then converted to an encoded mixed signal 46 by the encoder 18.

The VoIP mixer 10 further includes a parameter estimator 50. The parameter estimator 50 receives at least one pair of speech parameters 28, 30 from the first and second parameter decoders 24, 26. Based upon the at least one pair of speech parameters 28, 30, the parameter estimator 50 produces a parameter estimate 56 that is input to the encoder 18 for use in encoding the mixed signal 44. By having the encoder 18 utilize an estimated parameter derived from one or more of the speech parameters 28, 30 already obtained during the decoding process by the decoders 12, 14, the delay and complexity of the encoder 18 can be reduced and the overall speed of the mixing is enhanced.

In one embodiment, the parameter estimator 50 is a pitch estimator that receives first and second pitch parameters 52, 54 from the decoders 12, 14. The first and second pitch parameters 52, 54 each include values for pitch delay, pitch gain and frame energy. The parameter estimate 56 produced by the pitch estimator 50 is an estimated pitch delay.

In one embodiment, the pitch estimator 50 determines the estimated pitch delay by comparing the pitch energies of the input first and second pitch parameters 52, 54 and choosing the one with the strongest pitch energy. Accordingly, the pitch estimator 50 utilizes a principle of strong-pitch-domination, i.e. that the input signal with the strongest pitch energy will dominate the pitch characteristics of the mixed signal. In one embodiment, the pitch energies are assessed by considering the signal energy, the pitch gain normalized by the signal energy, and the pitch variation. By default, it is assumed that the pitch delay should not vary greatly for voiced speech. Accordingly, if the pitch delay differs from frame to frame by more than 20, a smaller weight is given to the case on the basis that the frame relates to an unvoiced or transient period of the speech.

The estimated pitch delay is used by the encoder 18 instead of an open-loop pitch delay search. The elimination of the open-loop pitch delay search reduces the complexity of the mixer by more than 7%.

Referring still to FIG. 1, the encoder 18 includes a pre-processing module 58 and a line spectrum pairs (LSP) analysis module 60. The encoder 18 also includes a codebook search module 62, which includes a closed-loop pitch search component 64 and an adaptive fixed codebook search component 66. The closed-loop pitch search component 64 receives the estimated pitch delay from the pitch estimator 50.

Figure 2:
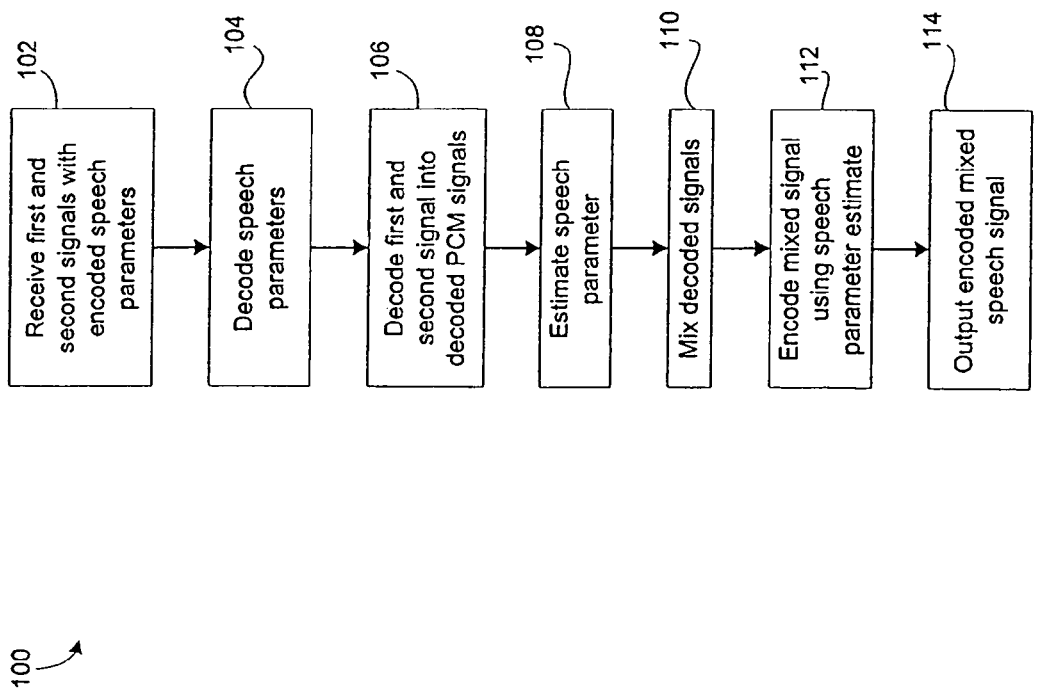
FIG. 2 shows, in flowchart form, a method of mixing signals having encoded speech parameters in an VoIP system.

Reference is now made to FIG. 2, which shows in flowchart form a method 100 of mixing signals having encoded speech parameters in an VoIP system.

The method 100 begins in step 102 with the receipt of first and second signals. The first and second signals are encoded using a communications protocol that encodes various speech parameters within the signals. These parameters may include parameters reflecting short- and/or long-term correlations in the speech signal and other parameters for refining the signal. One such communications protocol is the G.729(A) protocol. The G.729(A) protocol encodes various speech parameters in an encoded signal, including pitch parameters.

In step 104, the signals are each decoded to obtain the encoded speech parameters and in step 106 the decoding of each signal is completed (in part, using the decoded speech parameters in accordance with the communications protocol) to obtain first and second decoded PCM signals.

Having obtained speech parameters for the first and second signals during step 104, the speech parameters are then used in step 108 to generate a parameter estimate.

The decoded PCM signals are mixed in a mixer in step 110 to create a mixed signal, which is then encoded by an encoder in step 112. The encoder uses the parameter estimate generated in step 108 to assist in encoding the mixed signal in step 112. Finally, in step 114, an encoded mixed signal is output.

It will be understood by those of ordinary skill in the art that the present invention is not limited to strong-pitch-domination. Various other parameters identified in the decoding process may be provided to the parameter estimator 50 (FIG. 1) in order to produce a parameter estimate 56 for use by the encoder 18, including the linear spectrum pairs parameters and the algebraic codebook parameters.

It will also be understood by those of ordinary skill in the art that the present invention is not limited to narrowband G.729(A) protocol mixers, but extends to mixers for any input signal encoded using a protocol that encodes speech parameters that are extracted for the decoding process and are calculated during the encoding process. Without limiting the scope of the present invention, other such protocols include G.722.2, which also employs the ACELP model.

Figure 3:
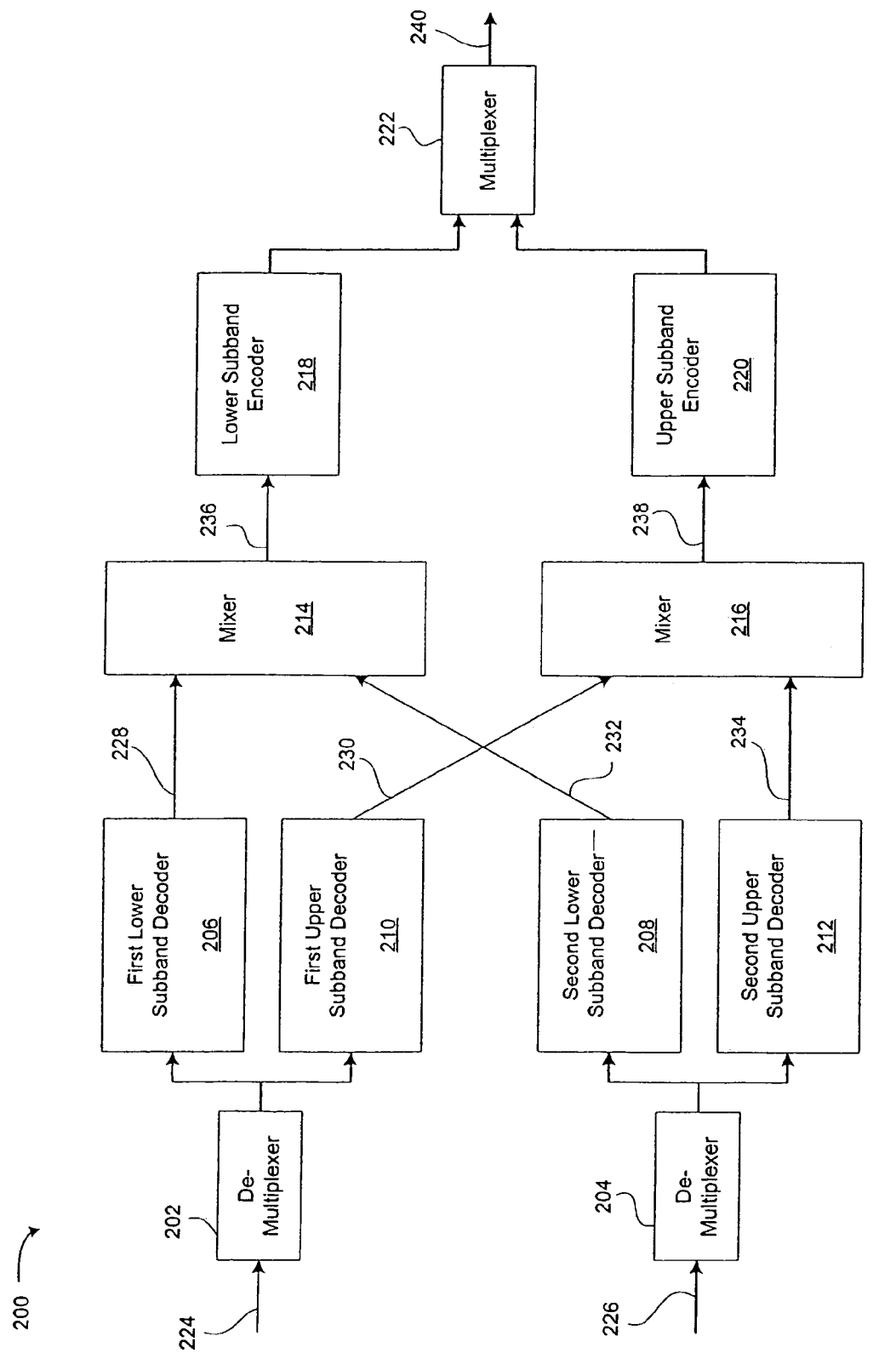
FIG. 3 shows, in block diagram form, an embodiment of a VoIP mixer for mixing signals having upper and lower sub-bands.

Reference is now made to FIG. 3, which shows, in block diagram form, an embodiment of a VoIP mixer 200 for mixing signals having upper and lower sub-bands.

In a conventional mixer for VoIP signals having upper and lower sub-bands, the first and second signals are individually decoded according to the relevant communications protocol. For each signal this typically involves demultiplexing the signal into its respective upper and lower sub-bands and decoding each sub-band according to the communications protocol. The decoded upper and lower sub-bands are then combined in a receive quadrature mirror filter (QMF) to create a decoded wideband signal. The first and second decoded wideband signals thus created are then combined in a mixer. The output of the mixer is a mixed wideband signal.

Following the mixer, the mixed wideband signal is then passed through a transmit QMF to separate the mixed wideband signal into upper and lower sub-bands. These upper and lower sub-bands are then encoded according to the communications protocol and recombined in a multiplexer for transmission within the VoIP system.

The VoIP mixer 200 shown in FIG. 3 eliminates the need for QMFs by performing sub-band mixing. The VoIP mixer 200 includes first and second demultiplexers 202, 204, first and second lower sub-band decoders 206, 208, first and second upper sub-band decoders 210, 212, first and second mixers 214, 216, a lower sub-band encoder 218, an upper sub-band encoder 220, and a multiplexer 222.

The VoIP mixer 200 receives a first input signal 224 at the first demultiplexer 202 and a second input signal 226 at the second demultiplexer 204. The first and second input signals 224, 226 are wideband signals having upper and lower sub-bands.

In one embodiment, the first and second input signals 224, 226 are encoded using the G.722 protocol. G.722 uses sub-band adaptive differential pulse code modulation (SB-AD-PCM) within a bit rate of 64 kbit/s. The frequency band is split into higher and lower sub-bands and each sub-band is encoded using ADPCM technology. Because of the perceptual importance of the lower sub-band, G.722 allocates more bits to the lower sub-band than the higher sub-band, resulting in a 48 kbit/s lower sub-band stream and a 16 kbit/s higher sub-band stream. These streams are then combined into a 64 kbit/s stream using a multiplexer to produce an encoded G.722 signal.

In the VoIP mixer 200, the demultiplexers 202, 204 output first lower and upper sub-band streams and second lower and upper sub-band streams, which are input to the first lower and upper sub-band decoders 206, 210, and the second lower and upper sub-band decoders 208, 212, respectively. The first lower sub-band decoder 206 produces a decoded first lower sub-band signal 228. The first upper sub-band decoder 210 produces a decoded first upper sub-band signal 230. Similarly, the second lower sub-band decoder 208 produces a decoded second lower sub-band signal 232 and the second upper sub-band decoder 212 produces a decoded second upper sub-band signal 234.

The two decoded lower sub-band signals 228, 232 are mixed together in the first mixer 214 to produce a lower sub-band mixed signal 236. The two decoded upper sub-band signals 230, 234 are mixed together in the second mixer 216 to produce an upper sub-band mixed signal 238.

The lower and upper sub-band mixed signals 236, 238 are then encoded by the lower sub-band encoder 218 and the upper sub-band encoder 220, respectively, and the outputs are multiplexed by the multiplexer 222 to produce a mixed wideband output signal 240.

By mixing the two signals at the sub-band level, the VoIP mixer 200 reduces the hardware complexity by eliminating the need for quadrature mirror filters. The reduction in additional filtering also improves signal quality and reduces algorithmic delay. The overall reduction in mixer complexity is about 37% for the multiplications and about 45% for the additions.

Figure 4:
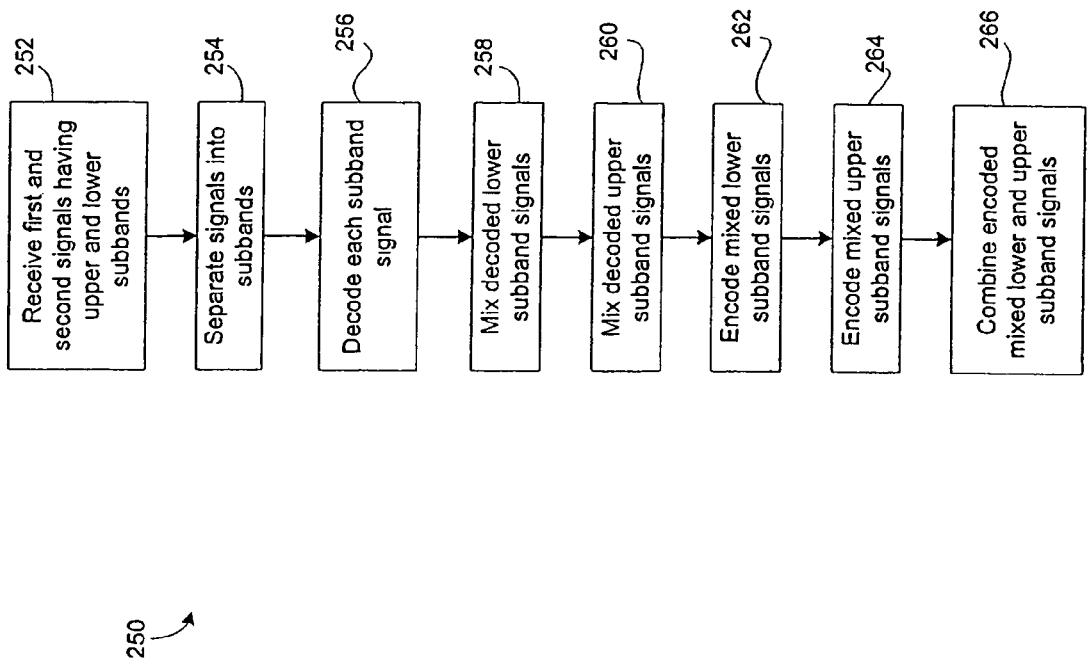
FIG. 4 shows, in flowchart form, a method for mixing signals having upper and lower sub-bands in a VoIP system.

Reference is now made to FIG. 4, which shows in flowchart form a method 250 for mixing signals having upper and lower sub-bands in a VoIP system.

The method 250 begins in step 252 with receiving a first and a second signal. The first and second signals are wideband signals having upper and lower sub-bands. An example of a communications protocol that results in such signals is the G.722 protocol.

In step 254, the first and second signals are separated into their respective upper and lower sub-bands. In one embodiment, this step is performed by a demultiplexer. Then, in step 256, each of the upper and lower sub-band signals resulting from step 254 are decoded according to the relevant communications protocol used to encode them, so as to produce decoded upper and lower sub-band signals. For example, with the G.722 protocol, ADPCM decoding is utilized to recover the decoded sub-band signals.

In step 258, the first and second decoded lower sub-band signals are mixed in a mixer, and in step 260, the first and second decoded upper sub-band signals are mixed in a mixer. The output of each of the mixers—lower and upper mixed sub-band signals, respectively—are then encoded in steps 262 and 264, in accordance with the relevant communications protocol. The encoded upper and lower mixed sub-band signals are then combined in step 266 to produce the mixed wideband output signal.

Reference is now made to FIG. 5, which shows a block diagram of a VoIP transcoder 300 for converting a wideband signal to a narrowband signal.

In a conventional VoIP transcoder for converting a wideband signal having upper and lower sub-bands to a narrowband signal, the wideband signal is decoded according to the relevant communications protocol and then downsampled and encoded as a narrowband signal, i.e. converted into A- or μ-law PCM. The decoding of the wideband signal typically involves demultiplexing the signal into its respective upper and lower sub-bands and decoding each sub-band according to the communications protocol and then recombining the signals using a receive QMF. The downsampling is then performed by low pass filtering the decoded wideband signal at 16 kHz and deleting alternate samples.

The VoIP transcoder 300 shown in FIG. 5 eliminates the need for QMFs by using only the lower sub-band of the input signal. The VoIP transcoder 300 includes a lower sub-band decoder 302, a low pass filter 304, and an encoder, which in one embodiment is an A- or μ-law converter 306.

The VoIP transcoder 300 receives an input wideband signal 308 at the lower sub-band decoder 302. The input wideband signal 308 is a wideband signal having upper and lower sub-bands. In one embodiment, the input wideband signal 308 is encoded using the G.722 protocol.

The lower sub-band decoder 302 includes a demultiplexer for separating the upper and lower sub-bands within the input wideband signal 308. It also includes a decoder for the lower sub-band signal that decodes the lower sub-band in accordance with the relevant communications protocol, such as the ADPCM decoding required by G.722. The output of the lower sub-band decoder 302 is a decoded lower sub-band signal 310.

The lower sub-band signal 310 is filtered by the low pass filter 304, which has a cutoff at 8 kHz. The low pass filter 304 removes high frequency aliasing present in the lower sub-band signal 310 as a result of the quadrature mirror filter present in the encoding process. The low pass filter 304 produces a filtered signal 312 that is then converted to an encoded narrowband signal 314 by the A- or µ-law converter 306. In one embodiment, the encoded narrowband signal 314 is a G.711 signal, encoded according to the G.711 communications protocol by the A- or µ-law converter 306.

The signal processing performed by the transcoder 300 to convert a wideband signal to a narrowband signal may be referred to as high frequency suppression.

A method 350 of transcoding a wideband signal into a narrowband signal in a VoIP system is shown in flowchart form in FIG. 6. The method 350 uses high frequency suppression.

The method 350 begins in step 352 with receipt of the input wideband signal. Then, in step 354, the lower sub-band portion of the wideband signal is decoded according to the relevant communications protocol, which, in one embodiment, comprises the G.722 protocol. As mentioned above, step 354 may include demultiplexing the input wideband signal into its upper and lower sub-bands and decoding the lower sub-band to produce a decoded lower sub-band signal.

In step 356, the lower sub-band signal is filtered by a low pass filter to remove aliasing from the upper sub-band signal that was introduced when the wideband signal was originally encoded. The filtered lower sub-band signal is then converted to A- or µ-law PCM by a converter to produce the output narrowband signal.

The high frequency suppression used to convert a wideband signal into a narrowband signal may also be employed in mixing a narrowband signal and a wideband signal to produce a narrowband output signal.

Figure 7:
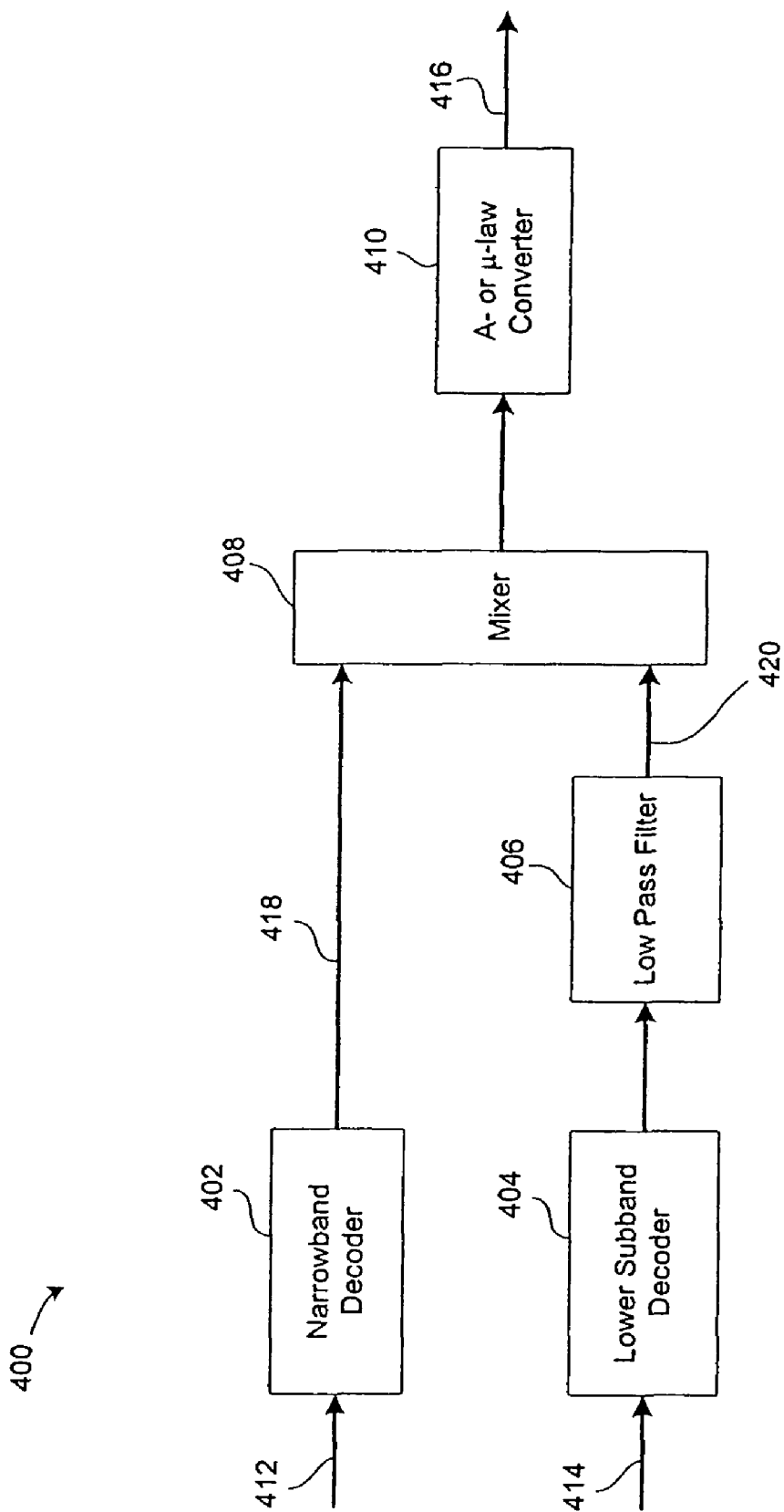
FIG. 7 shows a block diagram of a VoIP mixer for mixing an input narrowband signal with an input wideband signal to produce an output narrowband signal.

Reference is now made to FIG. 7, which shows a block diagram of a VoIP mixer 400 for mixing an input narrowband signal with an input wideband signal to produce an output narrowband signal.

In a conventional hybrid mixer for receiving a narrowband signal and a wideband signal and outputting a narrowband mixed signal, the wideband signal is converted to a narrowband signal and is mixed with the input narrowband signal. As with the high frequency suppression transcoder 300 described above in connection with FIG. 5, the hybrid mixer may be improved by working only with the lower sub-band component of the input wideband signal.

Like the high frequency suppression transcoder 300 (FIG. 5), the VoIP mixer 400 includes a lower sub-band decoder 404, a low pass filter 406, and a narrowband encoder, which in one embodiment is an A- or µ-law converter. The VoIP mixer 400 further includes a narrowband decoder 402 and a mixer 408.

The VoIP mixer 400 receives an input narrowband signal 412 and processes the input narrowband signal 412 using the narrowband decoder 402 to produce a decoded narrowband signal 418. In one embodiment, the input narrowband signal 412 is encoded according to the G.711 communications protocol.

An input wideband signal 414 is received and processed by the lower sub-band decoder 404, which produces a decoded lower sub-band signal. As with the lower sub-band decoder 302 (FIG. 5) in the VoIP transcoder 300 (FIG. 5), the lower sub-band decoder 404 in the VoIP mixer 400 includes a demultiplexer for separating the upper and lower sub-bands within the input wideband signal 414 and a decoder for the lower sub-band signal that decodes the lower sub-band in accordance with the relevant communications protocol, such as the ADPCM decoding required by G.722.

The decoded lower sub-band signal is then filtered by the low pass filter 406, which removes high frequency aliasing present in the lower sub-band signal as a result of the quadrature mirror filtering present in the encoding process. The low pass filter 406 has a cutoff frequency of 8 kHz and is similar to the low pass filter 304 (FIG. 5) described with respect to the VoIP transcoder 300 (FIG. 5). The low pass filter 406 outputs a filtered decoded narrowband signal 420.

The filtered decoded narrowband signal 420 and the decoded narrowband signal 418 are mixed by the mixer 408, and the output mixed narrowband signal is converted into an encoded narrowband signal 416 by the A- or µ-law converter 410.

It will be understood that the narrowband encoders discussed above—i.e. the A- or µ-law converters 306 (FIG. 5) and 410 (FIG. 7) for G.711 encoding—and the corresponding narrowband decoder 402, are not limited to G.711 encoding/decoding. Other narrowband communications protocols may be used, for example G.729, G.729(A), and others.

By using high frequency suppression in a hybrid bandwidth to narrowband mixer, the overall complexity of the mixer is reduced by about two-thirds and the overall delay is improved.

Figure 8:
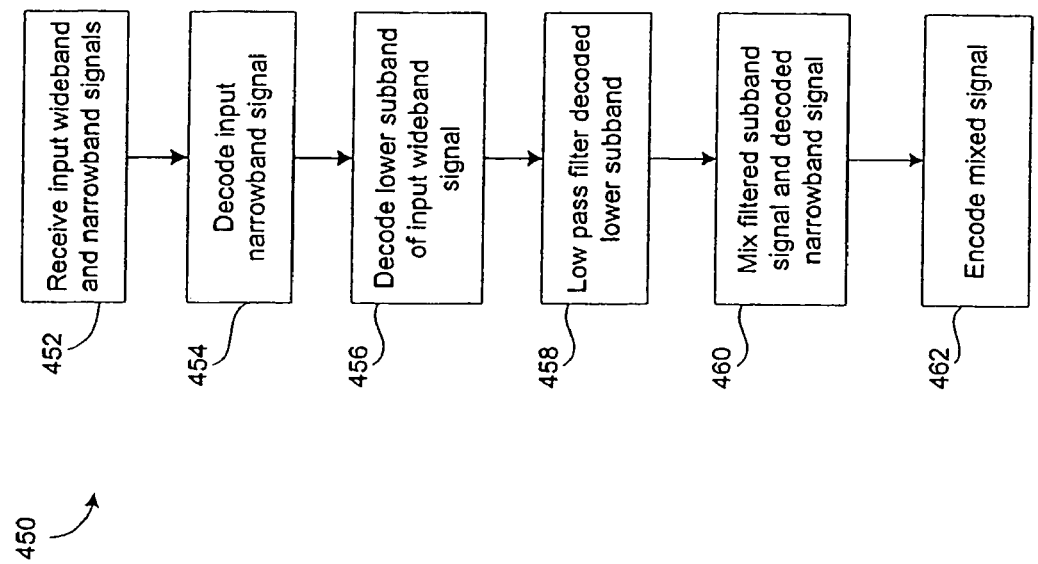
FIG. 8 shows, in flowchart form, a method for mixing an input narrowband signal with an input wideband signal to produce an output narrowband signal in a VoIP system.

Reference is now made to FIG. 8, which shows, in flowchart form, a method 450 for mixing an input narrowband signal with an input wideband signal to produce an output narrowband signal in a VoIP system.

The method 450 begins in step 452 when the input signals are received. The input signals include a narrowband signal and a wideband signal. The narrowband signal is encoded according to a narrowband communications protocol, such as G.711, G.729, or others. The wideband signal is encoded according to a wideband communications protocol, such as G.722, or others.

In step 454, the input narrowband signal is decoded by a narrowband decoder in accordance with the relevant communications protocol, producing a decoded narrowband signal.

In step 456, the input wideband signal is split into its lower sub-band and upper sub-band, and the lower sub-band is decoded by a lower sub-band decoder in accordance with the relevant communications protocol. For example, in one embodiment, the wideband signal is encoded using the G.722 protocol, so the lower sub-band is decoded with a SB-ACPCM decoder configured in accordance with G.722.

The decoded lower sub-band signal resulting from step 456 is then filtered by a low pass filter in step 458. The low pass filter has a cutoff frequency at 8 kHz and results in a filtered lower sub-band signal.

In step 460, the filtered lower sub-band signal is mixed with the decoded narrowband signal in a mixer to produce a mixed signal. The mixed signal is then encoded in step 462 by a narrowband encoder in accordance with a narrowband communications protocol, such as G.711.

Figure 9:
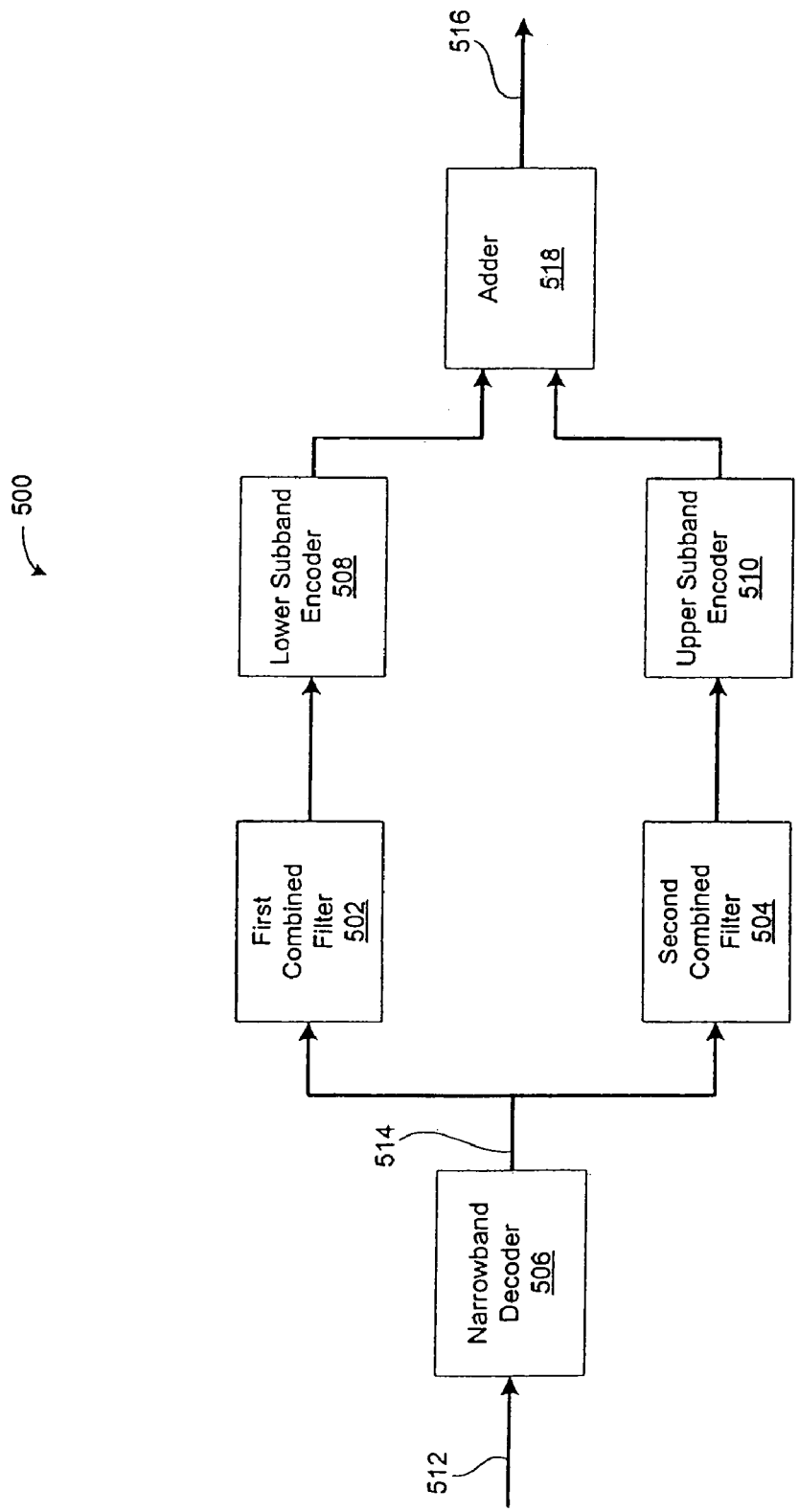
FIG. 9 shows a block diagram of a VoIP transcoder for converting a narrowband signal to a wideband signal.

Reference is now made to FIG. 9, which shows a block diagram of a VoIP transcoder 500 for converting a narrowband signal to a wideband signal. The VoIP transcoder 500 includes a first combined filter 502, a second combined filter 504, a lower sub-band encoder 508, an upper sub-band encoder 510, a narrowband decoder 506, and an adder 518.

In a conventional VoIP transcoder for converting a narrowband signal to a wideband signal, where the wideband signal has upper and lower sub-bands, the narrowband signal is decoded according to the relevant communications protocol and then up-sampled, lowpass filtered and encoded as a wideband signal. The encoding as a wideband signal includes passing the signal through a transmit QMF to create upper and lower sub-bands and then encoding the lower sub-band with a lower sub-band encoder and encoding the upper sub-band with an upper sub-band encoder. The two encoded sub-bands are then combined into an output wideband signal.

The transmit QMF can be considered a two-channel polyphase filter. In fact, the transmit QMF can be modeled as a low pass filter and down-sampler in parallel with a high pass filter and down-sampler. The filters of this model can be combined with the low pass filter appearing ahead of the transmit QMF to model the conventional VoIP transcoder as an up-sampler followed by a first combination filter and down-sampler in parallel with a second combination filter and down-sampler. Using the poly-phase structure again, the up-sampler and down-samplers may be eliminated by changing the first combination filter to the first combined filter 502 that includes the even coefficients of the first combination filter and by changing the second combination filter to the second combined filter 504 that includes the even coefficients of the second combination filter.

Figure 10:
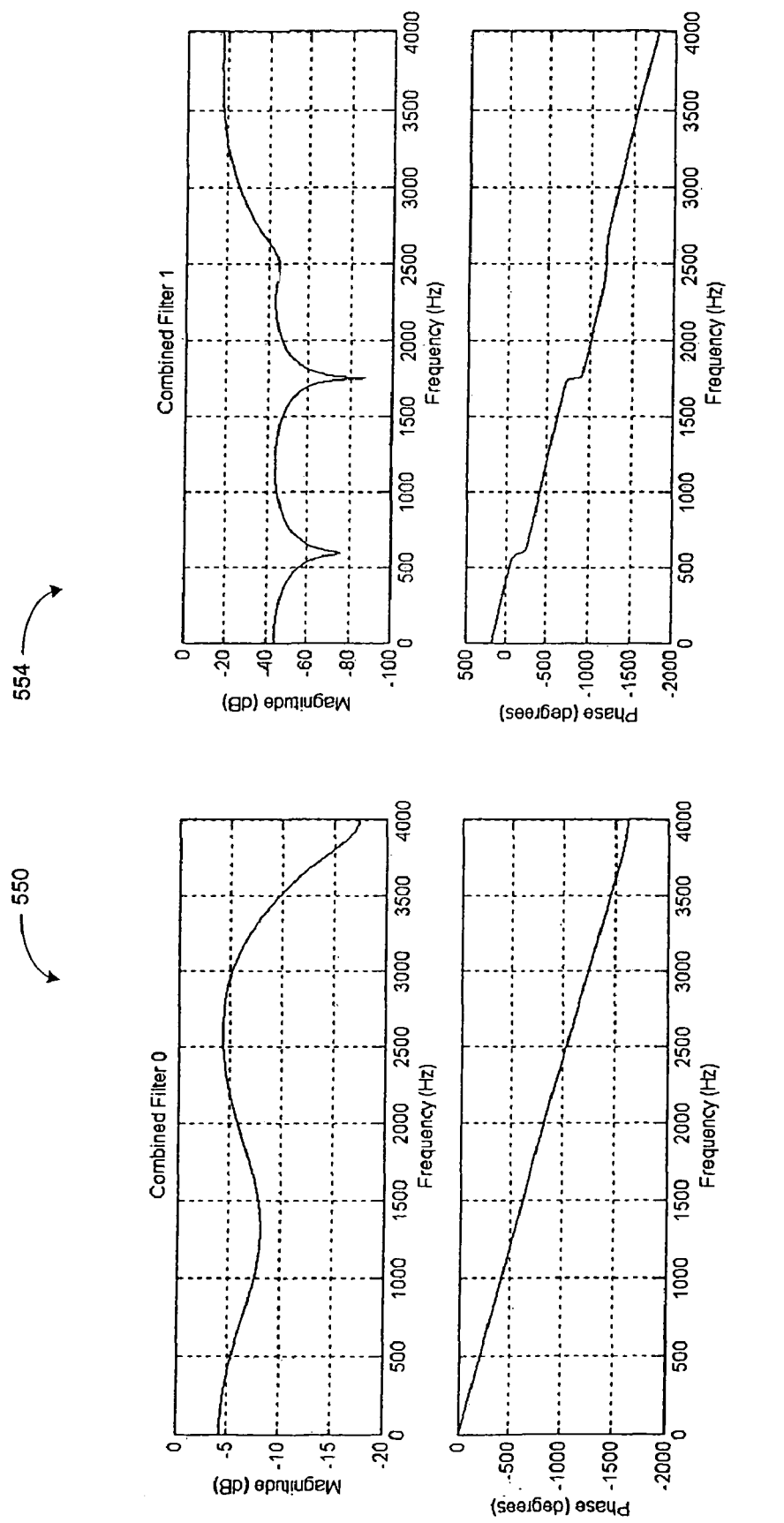
FIG. 10 shows graphs of the frequency responses of first and second combined filters in a filter-combination VoIP transcoder.

Reference is now made to FIG. 10, which shows graphs of the frequency responses of the first and second combined filters 502, 504 (FIG. 9), according to one embodiment of the present invention. The graphs include a first graph 550 of the magnitude versus frequency for the first combined filter 502, a second graph 552 of the phase versus frequency for the first combined filter 502, a third graph 554 of the magnitude versus frequency for the second combined filter 504, and a fourth graph 556 of the phase versus frequency for the second combined filter 504.

The frequency response of the two combined filters 502 and 504 is designed to mimic the aliasing found in lower sub-band and upper sub-band signals as a result of quadrature mirror filtering, so as to "trick" the lower and upper sub-band encoders and any subsequent wideband decoder into believing it has received a wideband encoded signal. This process may be referred to as filter-combination.

In one embodiment, the coefficients of the first and second combined filters 502 and 504 are, respectively:

$H_{502}$=[0.0000 −0.0001 0.0003 −0.0010 0.0022 −0.0053 0.0437 0.0315 −0.0655 0.4274 0.1687 −0.0795 0.0831 −0.0004 0.0031 −0.0015 0.0005 −0.0001 0.0000]; and $H_{504}$=[0.0000 0.0001 −0.0006 0.0018 −0.0032 0.0038 31 0.0055 −0.0032 0.0131 −0.0233 0.0296 −0.0296 0.0229 −0.0180 0.0078 −0.0023 0.0002 0.0001 −0.0000]

Referring again to FIG. 9, the VoIP transcoder 500 receives an input narrowband signal 512. The input narrowband signal 512 may be, for example, encoded using the G.711 protocol, or other narrowband communications protocols. The input narrowband signal 512 is decoded by the narrowband decoder 506 into a decoded signal 514 in accordance with the relevant communications protocol.

The decoded signal 514 is input to both the first combined filter 502 and the second combined filter 504, which filter the signal and produce a lower sub-band signal and an upper sub-band signal, respectively. The lower sub-band signal and the upper sub-band signal are then encoded by the lower sub-band encoder 508 and the upper sub-band encoder 510, respectively. In one embodiment, the wideband communications protocol used is G.722 and the lower and upper sub-band encoders 508 and 510 are ADPCM encoders operating in accordance with the G.722 protocol.

The encoders 508 and 510 output encoded lower and upper sub-band signals that are combined in the adder 518 to create a wideband output signal 516.

Figure 11:
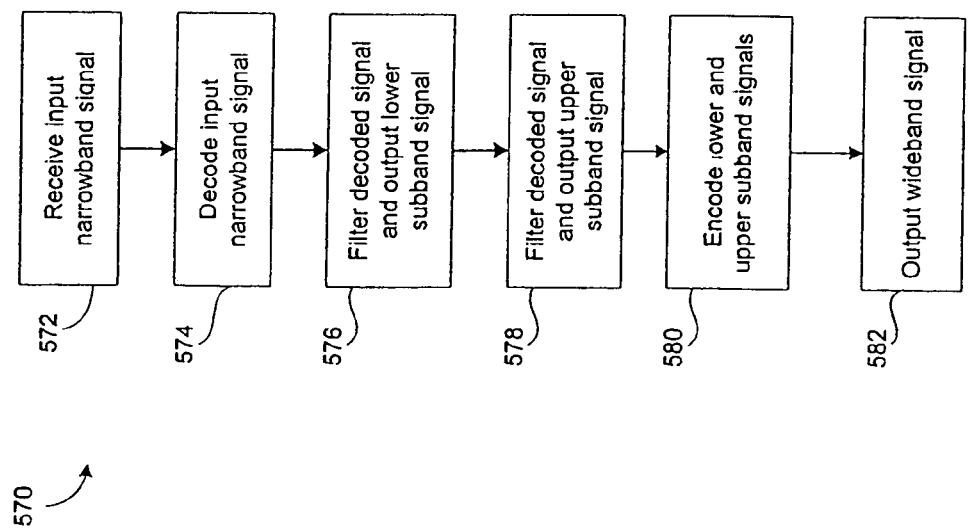
FIG. 11 shows, in flowchart form, a method for transcoding a narrowband signal into a wideband signal in a VoIP system.

Reference is now made to FIG. 11, which shows, in flow-chart form, a method 570 for transcoding a narrowband signal into a wideband signal in a VoIP system.

The method 570 begins in step 572 with the receiving of the input narrowband signal at a narrowband decoder. In step 574, the input narrowband signal is decoded by the narrow-band decoder, which outputs a decoded signal. This decoded signal is then input to both a first combined filter and a second combined filter.

In step 576, the first combined filter filters the decoded signal to produce a lower sub-band signal. Similarly, in step 578, the second combined filter filters the decoded signal to produce an upper sub-band signal. In step 580, the upper and lower sub-band signals are each encoded by respective upper and lower sub-band encoders to produce encoded upper and lower sub-band signals. These encoded upper and lower sub-band signals are then combined and output as the wideband signal in step 582.

The filter-combination used to convert a narrowband signal into a wideband signal may also be employed in mixing a narrowband signal and a wideband signal to produce a wideband output signal.

Figure 12:
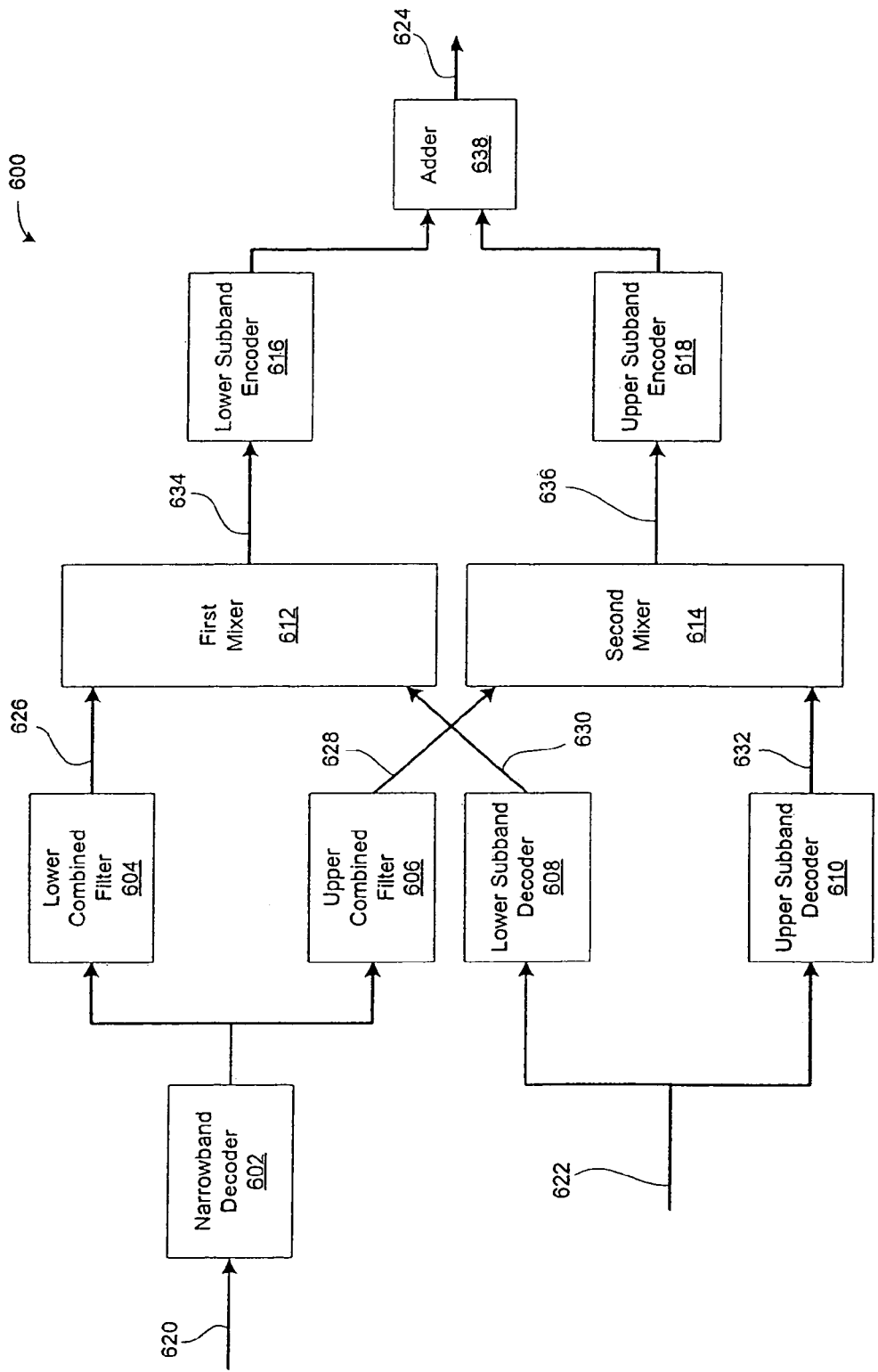
FIG. 12 shows a block diagram of a VoIP mixer for mixing an input narrowband signal with an input wideband signal to produce an output wideband signal.

Reference is now made to FIG. 12, which shows a block diagram of a VoIP mixer 600 for mixing an input narrowband signal with an input wideband signal to produce an output wideband signal.

In a conventional hybrid mixer for mixing an input narrowband signal with an input wideband signal to produce an output wideband signal, the input signals are decoded in the conventional manner and the decoded narrowband signal is then up-sampled and low pass filtered before being mixed with the decoded wideband signal. The mixed signal is then passed through a transmit QMF and encoded in the conventional manner. The decoding of the input wideband signal includes separating the upper and lower sub-bands, decoding each sub-band, and passing the decoded sub-bands through a receive QMF to produce a decoded wideband signal for mixing.

Using filter-combination and sub-band mixing, the VoIP mixer 600 eliminates the need for receive and transmit QMFs. The VoIP mixer 600 includes a narrowband decoder 602, a lower combined filter 604, an upper combined filter 606, a lower sub-band decoder 608, an upper sub-band decoder 610, a first mixer 612, a second mixer 614, a lower sub-band encoder 616, an upper sub-band encoder 618, and an adder 638. The VoIP mixer 600 receives an input narrowband signal 620 and an input wideband signal 622 and outputs a mixed wideband signal 624.

The narrowband decoder 602 decodes the input narrowband signal 620 into a decoded narrowband signal, in accordance with the relevant narrowband communications protocol, which, in one embodiment, is G.711. The decoded narrowband signal is then applied to both the lower and upper combined filters 604, 606, as described above with reference to the VoIP transcoder 500 (FIG. 9) and its first and second combined filters 502, 504 (FIG. 9). The lower and upper combined filters 604, 606 output a first lower sub-band signal 626 and a first upper sub-band signal 628, respectively.

The input wideband signal 622 is split into its encoded lower and upper sub-band signals, which are input to the lower and upper sub-band decoders 608, 610, respectively. The decoders 608, 610 decode the sub-band signals in accordance with the relevant wideband communications protocol, which, in one embodiment, is G.722. The lower and upper decoders 608, 610 output a second lower sub-band signal 630 and a second upper sub-band signal 632.

The first mixer 612 mixes the first lower sub-band signal 626 and the second lower sub-band signal 630 to produce a mixed lower sub-band signal 634. The second mixer 614 mixes the first upper sub-band signal 628 and the second upper sub-band signal 632 to produce a mixed upper sub-band signal 636.

The two mixed signals 634, 636 are encoded by the lower and upper sub-band encoders 616, 618, respectively, in accordance with the relevant wideband communications protocol, which, in one embodiment, is G.722. Following the encoders 616, 618, the encoded mixed signals are combined in the adder 638 to create the mixed wideband signal 624.

Figure 13:
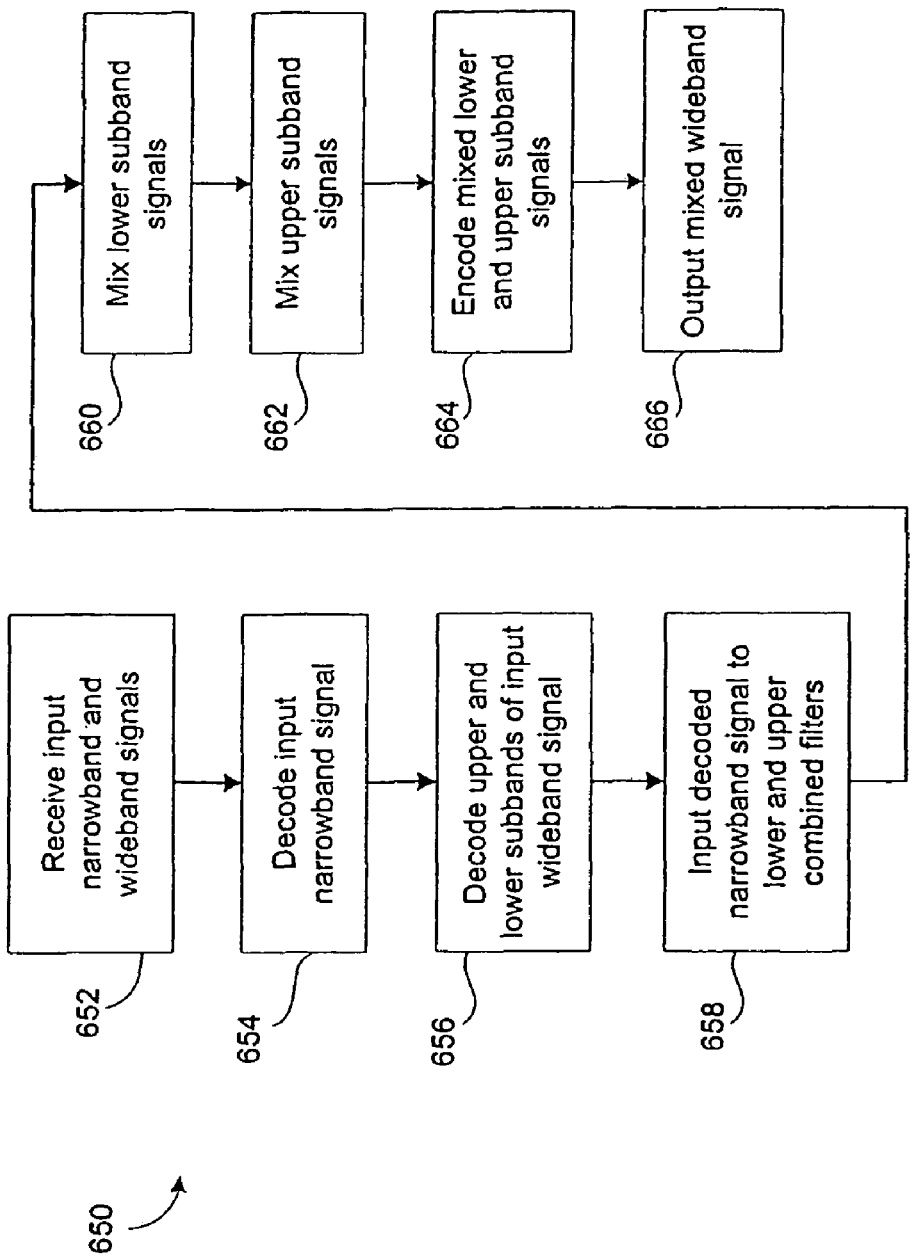
FIG. 13 shows, in flowchart form, a method for mixing an input narrowband signal with an input wideband signal to produce an output wideband signal, in a VoIP system.

Reference is now made to FIG. 13, which shows, in flowchart form, a method 650 for mixing an input narrowband signal with an input wideband signal to produce an output wideband signal, in a VoIP system.

The method 650 begins in step 652 when the input narrowband signal and the input wideband signal are received. In step 654, the input narrowband signal is decoded in accordance with the relevant narrowband communications protocol, thereby producing a decoded narrowband signal. In step 656, the input wideband signal is separated into its upper and lower sub-band signals and the sub-band signals are decoded in accordance with the relevant wideband communications protocol.

In step 658, the decoded narrowband signal is input to a lower combined filter and to an upper combined filter, which produce a first lower sub-band signal and a first upper sub-band signal, respectively. The decoding operation in step 656 results in a second lower sub-band signal and a second upper sub-band signal.

The first and second lower sub-band signals are mixed together in a first mixer in step 660 and the first and second upper sub-band signals are mixed together in a second mixer in step 662. The first and second mixers output lower and upper mixed signals, respectively.

In step 664, the lower. and upper mixed signals are encoded using a lower and an upper sub-band encoder, respectively, in accordance with the relevant communications protocol. The encoded lower and upper sub-band signals are then combined and output as the output wideband signal in step 666.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A transcoder for converting a first input signal to an output signal, the first input signal comprising a narrowband signal and the output signal comprising a wideband signal, the transcoder comprising:
(a) a narrowband decoder for receiving the first input signal and outputting a decoded signal;
(b) a first filter for receiving the decoded signal and outputting a first lower sub-band signal, the first filter having a transfer characteristic for introducing a first artificial aliasing into the decoded signal to produce the first lower sub-band signal;
(c) a second filter for receiving the decoded signal and outputting a first upper sub-band signal, the second filter having a transfer characteristic for introducing a second artificial aliasing into the decoded signal to produce the first upper sub-band signal; and
(d) a wideband encoder for receiving the first lower sub-band signal and the first upper sub-band signal, encoding the first lower sub-band and first upper sub-band signals, and producing the output signal;

wherein the transcoder excludes an up-sampler and excludes a quadrature mirror filter.

2. The transcoder claimed in claim 1, wherein the first and second artificial aliasings each alter the decoded signal to mimic the aliasing developed in a standard lower sub-band signal and a standard upper sub-band signal, respectively, as a result of quadrature mirror filtering.

3. The transcoder claimed in claim 1, wherein the narrowband decoder operates in accordance with the G.711 protocol.

4. The transcoder claimed in claim 1, wherein the wideband encoder operates in accordance with the G.722 protocol.

5. A VoIP mixer for mixing a first input signal with a second input signal, the second input signal comprising a wideband signal having a lower sub-band component and an upper sub-band component, the VoIP mixer comprising:
(a) a transcoder comprising:
a narrowband decoder for receiving the first input signal and outputting a decoded signal;
a first filter for receiving the decoded signal and outputting a first lower sub-band signal, the first filter having a transfer characteristic for introducing a first artificial aliasing into the decoded signal to produce the first lower sub-band signal;
a second filter for receiving the decoded signal and outputting a first upper sub-band signal, the second filter having a transfer characteristic for introducing a second artificial aliasing into the decoded signal to produce the first upper sub-band signal; and
a wideband encoder for receiving the first lower sub-band signal and the first upper sub-band signal, encoding the first lower sub-band and first upper sub-band signals, and producing an output signal;
wherein the transcoder excludes an up-sampler and excludes a quadrature mirror filter;
(b) a wideband decoder for receiving the second input signal and producing a second lower sub-band signal and a second upper sub-band signal;
(c) a lower sub-band mixer for mixing the first and second lower sub-band signals and producing a mixed lower sub-band signal; and
(d) an upper sub-band mixer for mixing the first and second upper sub-band signals and producing a mixed upper sub-band signal;
wherein the mixed lower sub-band signal and the mixed upper sub-band signal are input to the wideband encoder, which produces the output signal.

6. The VoIP mixer claimed in claim 5, wherein the first and second artificial aliasings each alter the decoded signal to mimic the aliasing developed in a standard lower sub-band signal and a standard upper sub-band signal, respectively, as a result of quadrature mirror filtering.

7. The VoIP mixer claimed in claim 5, wherein the narrowband decoder operates in accordance with the G.711 protocol.

8. . The VoIP mixer claimed in claim 5, wherein the wideband encoder and the wideband decoder operate in accordance with the G.722 protocol.

9. A method for converting a first input signal to an output signal in a VoIP system, the first input signal comprising a narrowband signal and the output signal comprising a wideband signal, the method comprising the steps of:
(a) narrowband decoding the first input signal to produce a decoded signal;
(b) filtering the decoded signal to produce a first lower sub-band signal, wherein said filtering includes introducing a first artificial aliasing into the decoded signal to produce the first lower sub-band signal;

(c) filtering the decoded signal to produce a first upper sub-band signal, wherein said filtering includes introducing a second artificial aliasing into the decoded signal to produce the first upper sub-band signal; and (d) wideband encoding the first lower sub-band signal and the first upper sub-band signal to produce the output signal;

wherein the method excludes up-sampling the decoded signal and wherein filtering excludes the use of quadrature mirror filters.

10. The method claimed in claim 9, wherein the first and second artificial aliasings each alter the decoded signal to mimic the aliasing developed in a standard lower sub-band signal and a standard upper sub-band signal, respectively, as a result of quadrature mirror filtering.

11. The method claimed in claim 9, wherein the step of narrowband decoding is performed in accordance with the G.711 protocol.

12. The method claimed in claim 9, wherein the step of encoding is performed in accordance with the G.722 protocol.

13. A method for mixing a first input signal with a second input signal in a VoIP system, the second input signal comprising a wideband signal having a lower sub-band component and an upper sub-band component, the method comprising the steps of:

narrowband decoding the first input signal to produce a decoded signal;

filtering the decoded signal to produce a first lower sub-band signal, wherein said filtering includes introducing a first artificial aliasing into the decoded signal to produce the first lower sub-band signal;

filtering the decoded signal to produce a first upper sub-band signal, wherein said filtering includes introducing a second artificial aliasing into the decoded signal to produce the first upper sub-band signal;

wideband encoding the first lower sub-band signal and the first upper sub-band signal to produce an output signal;

wherein the method excludes up-sampling the decoded signal and wherein filtering excludes the use of quadrature mirror filters;

wideband decoding the second input signal to produce a second lower sub-band signal and a second upper sub-band signal;

mixing the first and second lower sub-band signals to produce a mixed lower sub-band signal; and mixing the first and second upper sub-band signals to produce a mixed upper sub-band signal;

wherein the step of wideband encoding includes encoding the mixed lower sub-band signal and the mixed upper sub-band signal to produce the output signal.

14. The method claimed in claim 13, wherein the first and second artificial aliasings each alter the decoded signal to mimic the aliasing developed in a standard lower sub-band signal and a standard upper sub-band signal, respectively, as a result of quadrature mirror filtering.

15. The method claimed in claim 13, wherein the step of narrowband decoding is performed in accordance with the G.711 protocol.

16. The method claimed in claim 13, wherein the step of wideband encoding and the step of wideband decoding are performed in accordance with the G.722 protocol.

* * * * *